United States Patent [19]

Sugiyama et al.

[11] Patent Number: 5,081,842
[45] Date of Patent: Jan. 21, 1992

[54] INTERNAL COMBUSTION ENGINE WITH A DUAL TURBOCHARGER SYSTEM

[75] Inventors: Toshihisa Sugiyama, Gotenba; Mamoru Yoshioka, Susono; Kunihiko Nakata, Susono; Takashi Miyake, Aichi; Toru Kidokoro, Susono, all of Japan

[73] Assignee: Toyota Jidosha Kabushiki Kaisha, Toyota, Japan

[21] Appl. No.: 602,664

[22] Filed: Oct. 24, 1990

[30] Foreign Application Priority Data

Oct. 23, 1989 [JP] Japan .................. 1-273803
Mar. 26, 1990 [JP] Japan .................. 2-29586[U]

[51] Int. Cl.⁵ .................................... F02B 37/12
[52] U.S. Cl. ............................ 60/612; 60/600
[58] Field of Search ............... 60/600, 601, 602, 603, 60/612

[56] References Cited

U.S. PATENT DOCUMENTS

| | | | |
|---|---|---|---|
| 4,781,027 | 11/1988 | Richter et al. | 60/612 X |
| 5,003,781 | 4/1991 | Shibata et al. | 60/612 X |
| 5,005,359 | 4/1991 | Tashima et al. | 60/612 X |
| 5,020,327 | 6/1991 | Tashima et al. | 60/612 X |

FOREIGN PATENT DOCUMENTS

| | | |
|---|---|---|
| 334206 | 9/1989 | European Pat. Off. |
| 145328 | 8/1984 | Japan . |
| 146535 | 9/1984 | Japan . |
| 178329 | 11/1985 | Japan . |
| 112734 | 5/1986 | Japan . |
| 16729 | 1/1987 | Japan . |
| 300017 | 12/1989 | Japan . |
| 310136 | 12/1989 | Japan . |

Primary Examiner—Michael Koczo
Attorney, Agent, or Firm—Cushman, Darby & Cushman

[57] ABSTRACT

An internal combustion engine with a dual turbocharger system includes a first turbocharger and a second turbocharger arranged in parallel with each other. An exhaust switching valve is installed in an exhaust conduit downstream of a turbine of the second turbocharger and is actuated by a single diaphragm actuator. An exhaust bypass conduit is provided so as to bypass the exhaust switching valve, and an exhaust bypass valve is installed in the exhaust bypass conduit. Before the operation is changed from "one-turbocharger-operation" to "two-turbocharger-operation", the exhaust bypass valve is opened before the exhaust switching valve is opened, to suppress a shock which may occur at the transition from the "one-turbocharger-operation" to "two-turbocharger-operation".

19 Claims, 7 Drawing Sheets

INTERNAL COMBUSTION ENGINE WITH A DUAL TURBOCHARGER SYSTEM

BACKGROUND OF THE INVENTION

1. Field of the Invention

The present invention relates to an internal combustion engine with a dual turbocharger system having a first turbocharger and a second turbocharger wherein air is charged to the engine by a single turbocharger at low engine speeds and is charged by both turbochargers at high engine speeds.

2. Description of the Prior Art

Internal combustion engines with a dual turbocharger system are known by, for example, Japanese Patent Publications SHO 61-112734 and SHO 59-145328, and Japanese Utility Model Publication SHO 62-16729.

Figure 10:
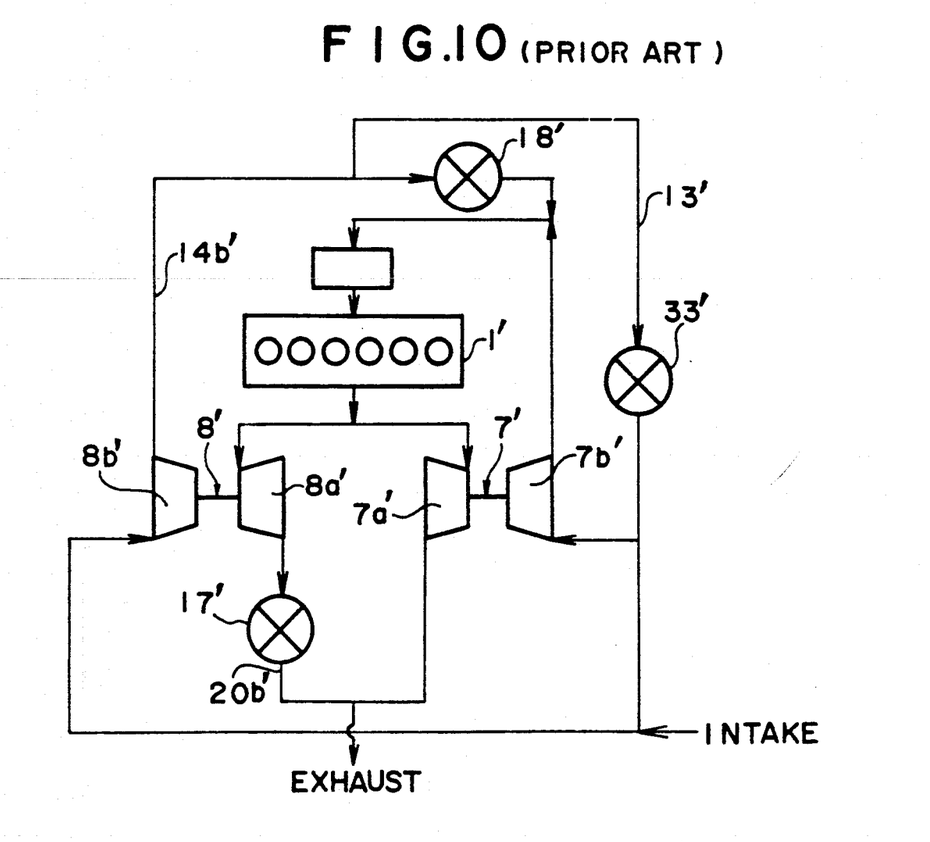
FIG. 10 is a system diagram of a conventional dual turbocharger system.
Figure 11:
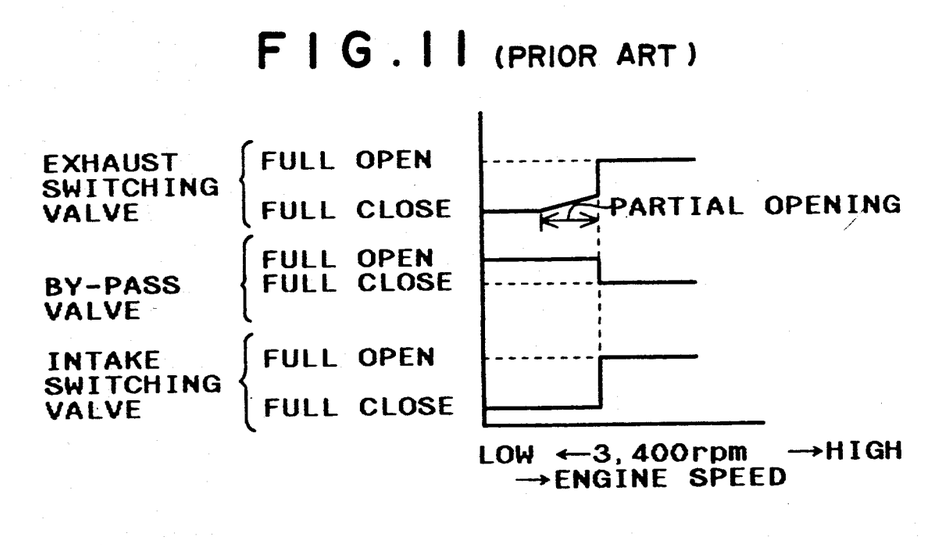
FIG. 11 is a diagram illustrating the opening and closing timings of the various valves of the internal combustion engine of FIG. 10.

As illustrated in FIG. 10 identified as Prior Art, a conventional turbocharged internal combustion engine 1' is provided with a first turbocharger 7' and a second turbocharger 8' having turbines 7a' and 8a', respectively, and compressors 7b' and 8b', respectively. In an exhaust conduit 20b' downstream of the turbine 8a' of the second turbocharger 8', an exhaust switching valve 17' is installed. Similarly, in an intake conduit 14b' downstream of the compressor 8b' of the second turbocharger 8', an intake switching valve 18' is installed. Further, in an intake bypass conduit 13' bypassing the compressor 8b' of the second turbocharger 8', an intake bypass valve 33' is installed. The timings of opening and closing of these valves 18', 33' and 17' are illustrated in FIG. 11 identified as Prior Art. As seen from FIG. 11, the exhaust switching valve 17' is closed at low engine speeds and is opened at high engine speeds. At medium engine speeds, the exhaust switching valve 17' is partially opened to operate the second turbocharger 8' so that a smooth transition from "one-turbocharger-operation" to "two-turbocharger-operation" is obtained.

However, there are some problems in the above-described conventional turbocharged engine.

First, the second turbocharger operation control by the partial opening of the exhaust switching valve 17' at medium engine speeds is relatively rough, because an exact flow control using a butterfly valve of the exhaust switching valve can not be expected in a case where the bore diameter of the exhaust conduit is large, for example, about 50 mm. As a result, a shock takes place during the transition from "one-turbocharger-operation" to "two-turbocharger-operation".

Second, since an actuator (not shown) for operating the exhaust switching valve must be capable of moving the valve to two positions, a full opening position and a partial opening position, the actuator has to comprise a double diaphragm actuator. As a result, the actuator is necessarily of a great size and it is difficult to mount it in a limited space near the second turbocharger.

In developing a structure for overcoming the above-described problems, it is preferable to locate valve means at a portion of the exhaust conduit 20b' downstream of the turbine 8a' of the turbocharger 8', because an exhaust gas temperature is decreased by about 100° C. at the turbocharger 8' and it becomes far easier to protect the valve means from high temperatures.

SUMMARY OF THE INVENTION

An object of the invention is to ensure a smooth transition from "one-turbocharger-operation" to "two-turbocharger-operation" in an internal combustion engine with a dual turbocharger system while maintaining a small size of the valve means and installing the valve means at a portion of the exhaust conduit downstream of the turbocharger turbine.

The above-described object can be attained by an internal combustion engine with a dual turbocharger system in accordance with the present invention. The engine includes a multi-cylinder internal combustion engine, a first turbocharger and a second turbocharger arranged in parallel with each other with respect to the engine, an exhaust line including a first exhaust conduit connected with a turbine of the first turbocharger and a second exhaust conduit connected with a turbine of the second turbocharger, an exhaust switching valve installed in the second exhaust conduit downstream of the turbine of the second turbocharger, an exhaust bypass conduit connecting a portion of the exhaust line upstream of the exhaust switching valve with a portion of the exhaust line downstream of the exhaust switching valve, and an exhaust by-pass valve installed in the exhaust bypass conduit.

In the above-described engine with a dual turbocharger system, the exhaust bypass valve is opened to preliminarily rotate the second turbocharger at medium intake air quantities before the exhaust switching valve is opened. Since only one portion of the exhaust gases is required to pass through the exhaust bypass conduit, the bore diameter of the exhaust bypass conduit can be smaller than the bore diameter of the second exhaust conduit. As a result, the accuracy of flow control by the exhaust bypass valve is increased as compared to a partial opening of the exhaust switching valve. Due to the preliminary running of the second turbocharger by opening the exhaust bypass valve, a shock in the transition from "one-turbocharger-operation" to "two-turbocharger-operation" is greatly decreased.

Further, since the exhaust switching valve need not be capable of taking a partial opening position, an actuator for actuating the exhaust switching valve can comprise a single diaphram-type actuator. As a result, the actuator can be of a small size and can be easily mounted in a limited space near the turbocharger.

Furthermore, since the exhaust switching valve and the exhaust bypass valve are installed in the exhaust conduits downstream of the turbine of the second turbocharger, the gas temperatures to which those valves are exposed are not relatively extreme. As a result, the valves are protected from thermal damages.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which.

DETAILED DESCRIPTION OF THE PREFERRED EMBODIMENTS

Figure 1:
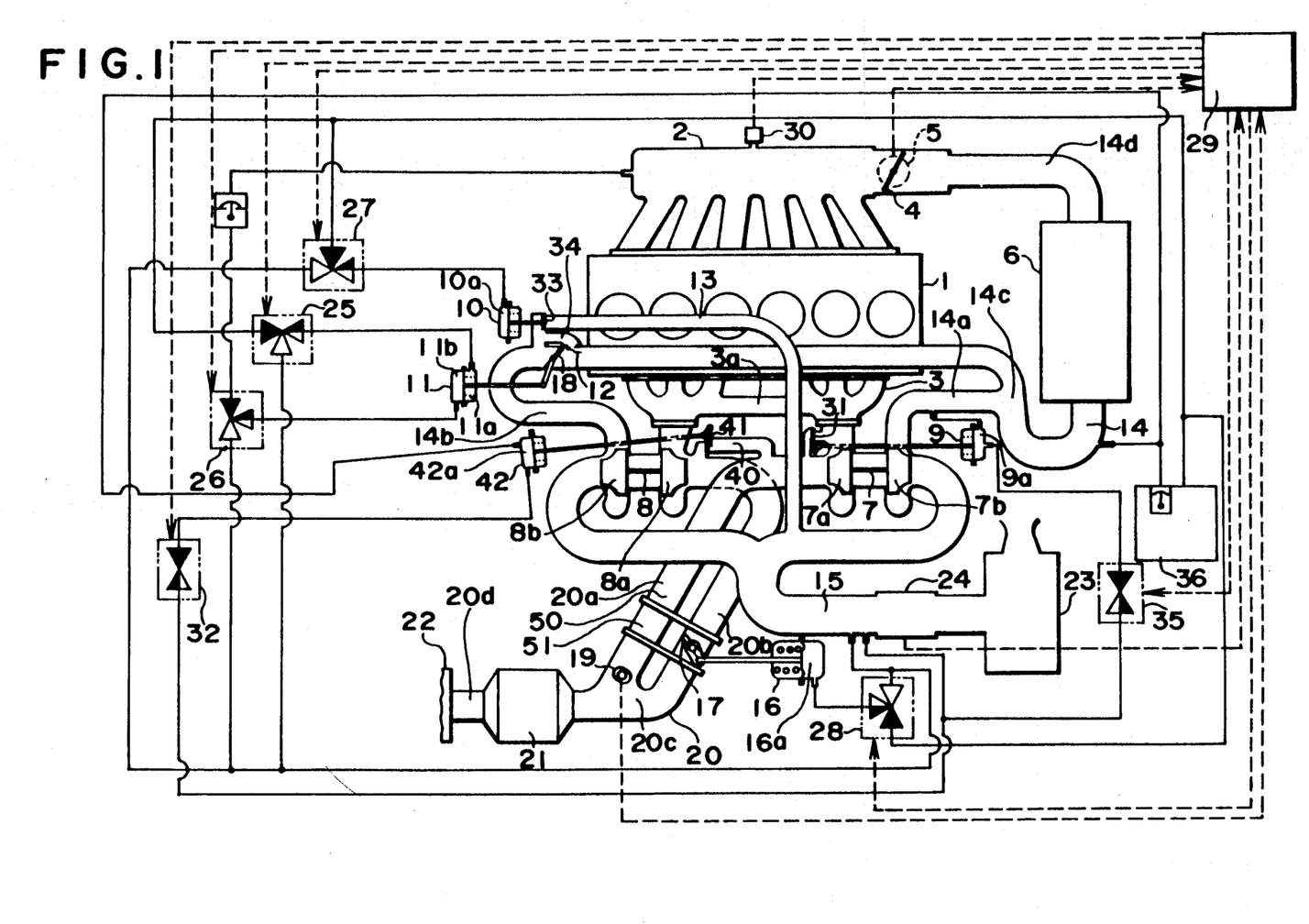
FIG. 1 is a schematic view of an internal combustion engine with a dual turbocharger system in accordance with the present invention.

Firstly, structures common to all embodiments of the present invention will be explained referring to FIG. 1. As illustrated in FIG. 1, an internal combustion engine with a dual turbocharger system includes a multi-cylinder, for example, a six-cylinder internal combustion engine 1 with an air intake and an exhaust outlet. Cylinders of the engine 1 are grouped into two groups. An exhaust manifold 3 which is connected with the engine exhaust outlets includes a first portion connected with one group of the engine cylinders and a second portion connected with another group of the engine cylinders. The first portion and the second portion of the exhaust manifold 3 communicate with each other by a connecting conduit 3a.

A first turbocharger 7 and a second turbocharger 8 are provided so as to be in parallel with each other with respect to the cylinder 1. The first turbocharger 7 is operated throughout all intake air quantities, and the second turbocharger 8 is operated only at great intake air quantities. The first turbocharger 7 includes a turbine 7a and a compressor 7b driven by the turbine 7a. Similarly, the second turbocharger 8 includes a turbine 8a and a compressor 8b driven by the turbine 8a. The turbine 7a of the first turbocharger 7 is connected with the first portion of the exhaust manifold 3 and the turbine 8a of the second turbocharger 8 is connected with the second portion of the exhaust manifold 3. As a result, the first and second turbines 7a and 8a are connected with the engine exhaust outlet via the exhaust manifold 3. On the other hand, the compressor 7b of the first turbocharger 7 and the compressor 8b of the second turbocharger 8 are connected with the air intake of the engine 1 via an intake line.

The intake line connected with the engine air intake includes a first intake passage 15 upstream of the compressors 7b and 8b and a second intake passage 14 downstream of the compressors 7b and 8b. Further, the second intake passage 14 includes a first intake conduit 14a located downstream of and connected with the compressor 7b, a second intake conduit 14b located downstream of and connected with the compressor 8b, a connecting portion 14c where the first intake conduit 14a and the second intake conduit 14b join each other, and a common intake conduit 14d connecting the connecting portion 14c with the engine air intake. In the first intake passage 15, an air cleaner 23 and an air flow meter 24 are installed in that order in an intake air flow direction. An intercooler 6, a throttle valve 4, and a surge tank 2 are also installed in that order in an intake air flow direction, respectively, in the common intake conduit 14d.

An exhaust line 20 connected to the engine exhaust outlets includes a first exhaust conduit 20a connected to the first portion of the exhaust manifold 3, in which the turbine 7a is installed, a second exhaust conduit 20b connected to the second portion of the exhaust manifold 3, in which the turbine 8a is installed, a connecting portion 20c where the first exhaust conduit 20a and the second exhaust conduit 20b join each other, and an exhaust pipe 20d located downstream of and connected to the connecting portion 20c. In the exhaust pipe 20d, a catalytic converter 21 and an exhaust muffler 22 are installed in an exhaust gas flow direction, respectively. Further, at the connecting portion 20c or in the vicinity of the connecting portion 20c, an oxygen sensor 19 is installed.

For the purpose of switching the operation between "one-turbocharger-operation" in which only the first turbocharger 7 is operated at small intake air quantities and "two-turbocharger-operation" in which both the first turbocharger 7 and the second turbocharger 8 are operated at large intake air quantities, an exhaust switching valve 17 is installed in the second exhaust conduit 20b downstream of the turbine 8a, and an intake switching valve 18 is installed in the second intake conduit 14b downstream of the compressor 8b. When both the exhaust switching valve 17 and the intake switching valve 18 are closed, only the first turbocharger 7 is operated. In contrast, when both the exhaust switching valve 17 and the intake switching valve 18 are opened, both the first turbocharger 7 and the second turbocharger 8 are operated.

For the purpose of minimizing a shock which will occur during the transition from "one-turbocharger-operation" to "two-turbocharger-operation", the second turbocharger 8 is run-up before it is fully rotated. In the conventional turbocharged engine, this running-up of the second turbocharger is achieved by partially opening the exhaust switching valve. However, in the present invention, an exhaust bypass, conduit 40 bypassing the exhaust switching valve 17 is provided, and the running-up of the second turbocharger 8 is achieved by opening an exhaust bypass valve 41 installed in the exhaust bypass conduit 40. More particularly, when the exhaust bypass valve 41 is opened, a relatively small amount of exhaust gas flows through the exhaust bypass conduit 40, so that the second turbocharger 8 is run-up. When the exhaust switching valve 17 is opened, the rotational speed of the second turbocharger 8 is increased from the run-up rotational speed. Therefore, the shock will be effectively suppressed.

When the second turbocharger 8 is preliminarily rotated and the intake switching valve 18 is closed, one portion of the pressurized air in the second intake conduit 14b between the compressor 8b and the intake switching valve 18 will leak through the compressor 8b to flow to a portion of the intake conduit upstream of the compressor 8b and then will again be driven by the compressor 8b to a portion of the intake conduit downstream of the compressor 8b. The leakage and repressurization of the intake gas will continually repeat, undesirably increasing the temperature of the intake gas and thus, the temperature of the impeller of the compressor 8b. To prevent the gas from rising in temperature, an intake bypass conduit 13 is provided so as to bypass the compressor 8b of the second turbocharger 8. More particularly, the intake bypass conduit 13 connects the portion of the second intake conduit 14b between the compressor 8b and the intake switching valve 18 with the first intake passage 15 upstream of the compressors 7b and 8b. In the intake bypass conduit 13, an intake bypass valve 33 is installed and adapted to open and close the intake bypass conduit 13. When the second turbocharger 8 is preliminarily rotated, the intake bypass valve 33 is opened to suppress the temperature increase of the intake gas.

An intake switching valve bypass conduit 34 is provided so as to connect a portion of the second intake conduit 14b upstream of the intake switching valve 18 with a portion of the intake conduit 14b downstream of the intake switching valve 18 to bypass the intake switching valve 18. A check valve 12 is installed in the intake switching valve bypass conduit 34. The check valve 12 permits the gas to flow in the direction from the portion of the second intake conduit 14b upstream of the intake switching valve 18 toward the portion of the second intake conduit 14b downstream of the intake switching valve 18. As a result, when the intake switching valve 18 is closed and when the compressor outlet pressure of the second turbocharger 8 grows to exceed a compressor outlet pressure of the first turbocharger 7, the check valve 12 opens the bypass conduit 34 and permits the gas to flow through the check valve 12. Further, the turbine 7a is provided with a waste gate valve 31. A positive pressure tank 36 for holding a charging pressure therein is also provided so as to be connected with the common intake conduit 14d, preferably, a portion of the common intake conduit 14d upstream of the intercooler 6.

Various actuators are provided to operate the above-described valves. More particularly, the waste gate valve 31 is operated by an actuator 9, the intake bypass valve 33 is operated by an actuator 10, the intake switching valve 18 is operated by an actuator 11, the exhaust switching valve 17 is operated by an actuator 16, and the exhaust bypass valve 41 is operated by the actuator 42. Each of these actuators comprises a single diaphragm-type actuator.

Various three-way or two-way solenoid valves 25, 26, 27, 28, 32 and 35 are provided to switch on and off the actuators 9, 10, 11, 16, and 42. These solenoid valves 9, 10, 11, 16, and 42 operate according to the instructions from an engine control computer 29. In this instance, "ON" of the three-way solenoid valve 25 actuates the actuator 11 to open intake switching valve 18, and "OFF" of the three-way solenoid valve 25 actuates the actuator 11 to close the intake switching valve 18. "ON" of the three-way solenoid valve 28 actuates the actuator 16 to open the exhaust switching valve 17, and "OFF" of the three-way solenoid valve 28 actuates the actuator 16 to close the exhaust switching valve 17. "ON" of the three-way solenoid valve 27 actuates the actuator 10 to close the intake bypass valve 33, and "OFF" of the three-way solenoid valve 27 actuates the actuator 10 to open the intake bypass valve 33. "ON" of the two-way solenoid valve 32 which may comprise a duty control valve actuates the actuator 42 to open the exhaust bypass valve 41, and "OFF" of the two-way solenoid valve 32 actuates the actuator 42 to close the exhaust bypass valve 41. Further, the actuator 16 includes a diaphragm chamber 16a; the actuator 10 includes a diaphragm chamber 10a; the actuator 11 includes diaphragm chambers 11a and 11b; the actuator 42 includes a diaphragm chamber 42a; and the actuator 9 includes a diaphragm chamber 9a.

Various sensors for sensing the engine operating conditions are provided and the outputs of the sensors are fed to the engine control computer 29. More particularly, the various sensors include an intake pressure sensor 30, a throttle opening degree detecting sensor 5, an intake air quantity detecting sensor comprising an air flow meter 24, and the aforementioned oxygen sensor 19.

Figure 2:
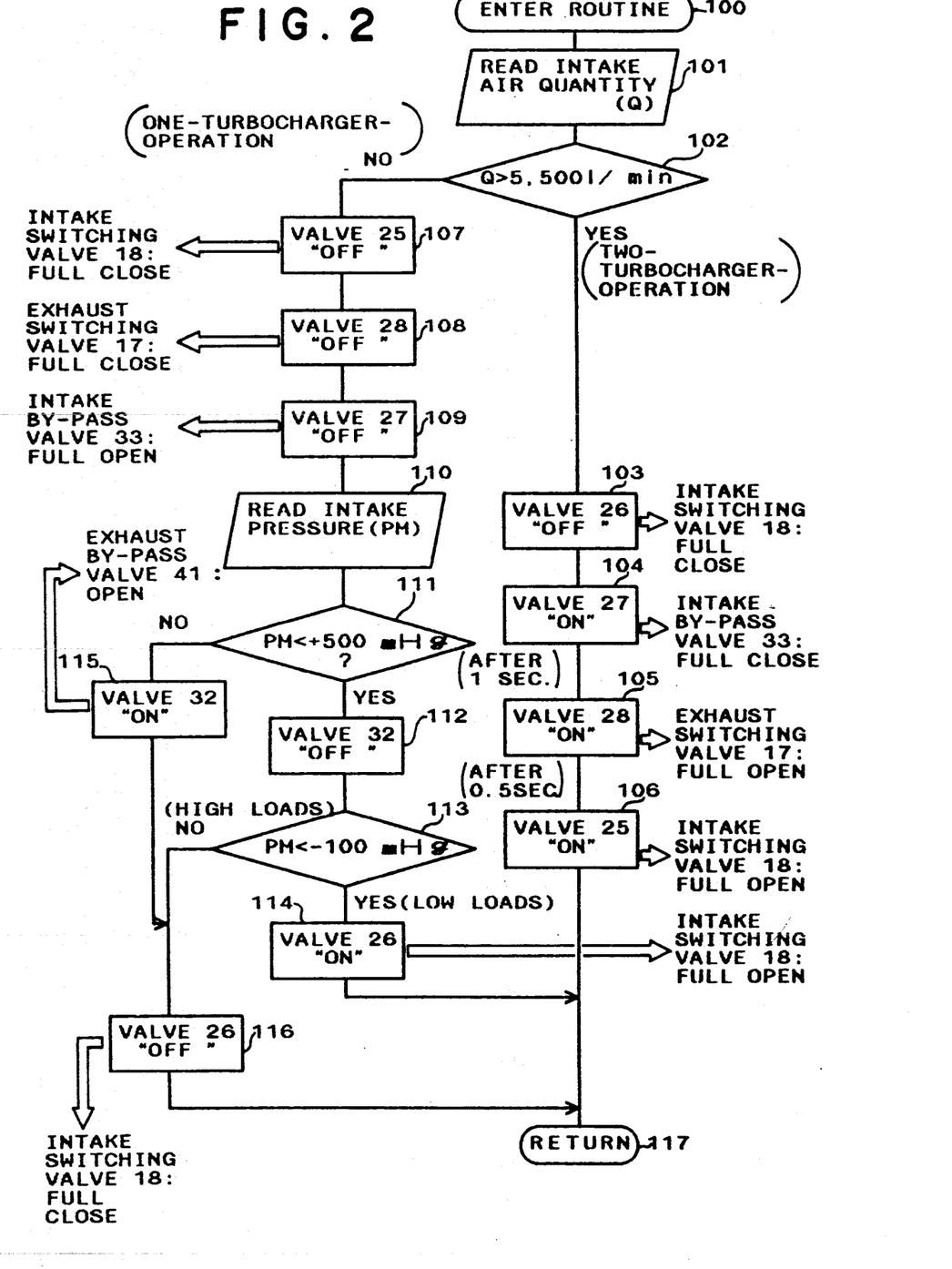
FIG. 2 is a flow diagram illustrating an operational control of the internal combustion engine of FIG. 1.

The engine control computer 29 includes a central processor unit (CPU), a read-only memory (ROM), a random access memory (RAM), an input and output interface (I/D interface), and an analog/digital convertor (A/D convertor) like a usual micro computer. FIG. 2 illustrates a program according to which the turbocharged internal combustion engine of the present invention is operated. The program of FIG. 2 is stored in the ROM and is fed into the CPU where the routine is executed to operate the above-described valves and actuators.

The flow diagram of FIG. 2 and the operation common to every embodiment of the invention will now be explained with reference to FIG. 2. The routine is entered at a step 100, and then the intake air quantity, that is, an output signal from the air flow meter 24 is read at a step 101.

Then, at a step 102, it is determined whether or not the intake air quantity Q is greater than a predetermined quantity, for example, 5,500 l/min, that is, whether or not the current engine operational condition is a condition to be operated under "two-turbocharger-operation". More particularly, when Q is greater than 5,500, the current condition is deemed to be a condition to be operated under "two-turbocharger-operation". In contrast, when Q is equal to or less than 5,500, the current condition is deemed to be a condition to be operated under "one-turbocharger-operation". However, since there is a time lag in switching the "one-turbocharger-operation" to the "two-turbocharger-operation", an actual change will occur at about 6,000 l/min rather than at 5,500 l/min.

When the engine operational condition is determined to be a condition to be operated under "two-turbocharger-operation", the routine proceeds to a step 103. At the step 103, in a case where the intake switching valve 18 is at a partially opened state, the three-way solenoid valve 26 is switched to "OFF" to close the intake switching valve 18. Then, at a step 104, the three-way solenoid valve 27 is switched to "ON" to introduce the intake pressure at a portion of the intake conduit downstream of the compressor (the charging pressure) into the diaphragm chamber 10a of the actuator 10 to thereby close the intake bypass valve 33.

Then, the routine further proceeds to a step 105. At the step 105, after a short period of time necessary to run-up the second turbocharger 8, for example, one second after the switching-on of the three-way solenoid valve 27, the three-way solenoid valve 28 is switched to "ON" to introduce the charging pressure into the diaphragm chamber 16a of the actuator 16 to thereby open the exhaust switching valve 17. If the compressor outlet pressure of the second turbocharger 8 grows greater than the compressor outlet pressure of the first turbocharger 7, the charging air pressurized by the second turbocharger 8 passes through the check valve 12 and is supplied to the engine 1. Then, at a step 106, after a short period of time, for example 0.5 second after the switching-on of the three-way solenoid valve 28, the three-way solenoid valve 25 is switched to "ON" to introduce the charging pressure into the diaphragm chamber 11a of the actuator 11 to thereby open the intake switching valve 18. In this state, both the first turbocharger 7 and the second turbocharger 8 are operating. Then, the routine proceeds to a step 117 and returns to another routine (not shown).

When the engine operational condition is determined to be a "one-turbocharger-operation" condition at the aforementioned step 102, the routine proceeds to a step 107. At the step 107, the three-way valve 25 is switched to "OFF" to close the intake switching valve 18. Then, at a step 108, the three-way solenoid valve 28 is switched to "OFF" to close the exhaust switching valve 17. Then, at a step 109, the three-way solenoid valve 27 is switched to "OFF" to open the intake bypass valve 33. By these steps 107, 108 and 109, the "one-turbocharger-operation" is produced. In this state, even if the second turbocharger 8 is rotated by the engine exhaust pressure, the air pressurized by the compressor 8b returns to the first intake passage 15 through the intake bypass conduit 13.

Then, the routine proceeds to a step 110 where the intake gas pressure PM is read. Then, at a step 111, whether or not the read intake gas pressure PM is less than a predetermined pressure, for example, 500 mmHg at which the second turbocharger should begin to be run-up is determined. If the charging pressure PM is less than 500 mmHg, the engine operational condition is deemed to be a condition to maintain the current "one-turbocharger-operation" and the routine proceeds to a step 112. At the step 112, the two-way solenoid valve 32 which comprises a duty control valve is switched to "OFF" to introduce the atmospheric pressure into the diaphragm chamber 42a of the actuator 42 to thereby close the exhaust bypass, valve 41.

Then, the routine proceeds to a step 113 where whether or not the engine load is low, for example, smaller than −100 mmHg is determined. If PM is equal to or larger than −100 mmHg and, therefore, the engine load is high, the routine proceeds to a step 116 where the three-way solenoid valve 26 is switched to "OFF" to close the intake switching valve 18. In this state, since the intake switching valve 18 is closed and the exhaust switching valve 17 is closed, the turbocharged system operates according to the "one-turbocharger-operation" and a good torque response is obtained.

When PM is smaller than −100 mmHg and, therefore, the engine load is low at the step 113, the routine proceeds to a step 114. At step 114, the three-way solenoid valve 26 is switched to "ON" to introduce a negative pressure at the surge tank 2 into a diaphragm chamber 11b of the actuator 11 to thereby open the intake switching valve 18. In this state, since the exhaust switching valve 17 is closed, the second turbocharger 8 is not driven and only the first turbocharger 7 operates. However, since the intake switching valve 18 is opened, the intake air can be supplied through both the first intake conduit 14a and the second intake conduit 14b. As a result, a great amount of intake air can be charged to the engine 1 and the acceleration characteristic from a low engine load is improved. Then, the routine proceeds to a step 117 and returns to another routine (not shown).

Figure 3:
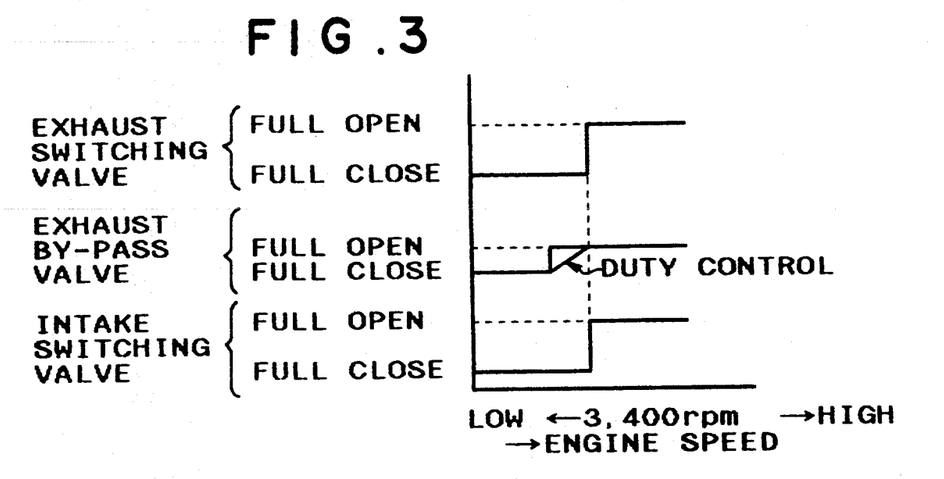
FIG. 3 is a diagram illustrating the opening and closing timings of the various valves of the internal combustion engine of FIG. 1.

When the charging pressure PM is not less than 500 mmHg at the step 111, the routine proceeds to a step 115 where the two-way solenoid valve 32 is switched to "ON" to open the exhaust bypass valve 41. In this way, before the current operation is changed from "one-turbocharger-operation" to "two-turbocharger-operation", the exhaust bypass valve 41 is opened to run-up the second turbocharger 8. As a result, a shock at the transition from "one-turbocharger-operation" to "two-turbocharger-operation" is effectively suppressed. The timings of opening and closing of the valves 17, 18, and 41 are shown in FIG. 3.

The internal combustion engine with a dual turbocharger system in accordance with the present invention has the following further features.

Figure 5:
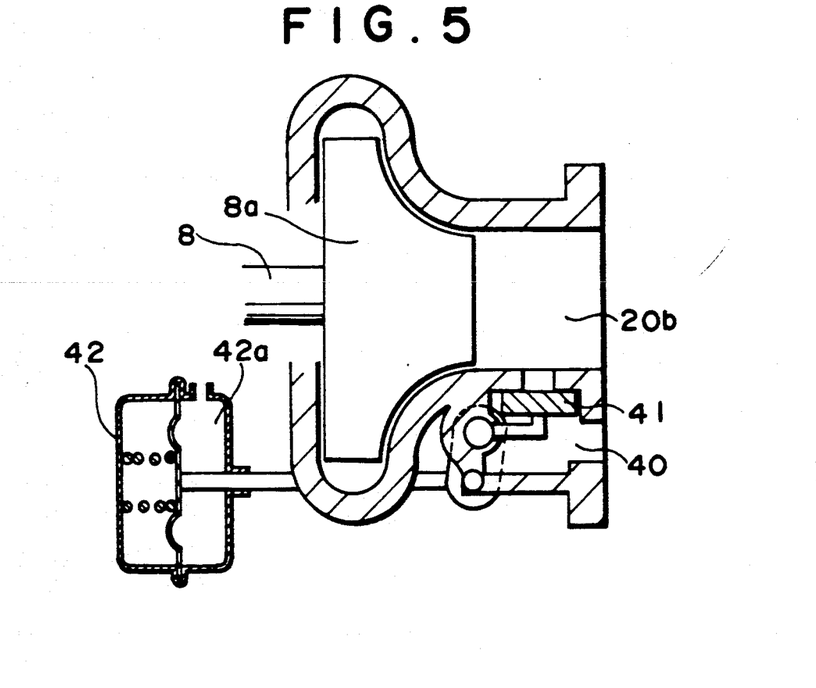
FIG. 5 is a cross-sectional view of structures of members located in the vicinity of an exhaust bypass valve of FIG. 4.

A bore diameter of the exhaust bypass conduit 40 is smaller than a bore diameter of the second exhaust conduit 20b. Since the exhaust switching valve 17 comprises a butterfly valve and the bore diameter of the second exhaust conduit 20b is relatively large, accuracy in flow control at the time of a partial opening of the exhaust switching valve 17 could not be expected, if the running-up of the second turbocharger 8 were performed through a partial opening of the exhaust switching valve 17. However, in the present invention, since the preliminary running of the second turbocharger 8 is performed not by a partial opening of the exhaust switching valve 17 but an opening of the exhaust bypass valve 41 and since the bore diameter of the exhaust bypass conduit 40 is smaller than that of the second exhaust conduit 20b, an accurate flow control at the time of the transition from "one-turbocharger-operation" to "two-turbocharger-operation" is obtained. Further, since the exhaust bypass valve 41 is of a swing-arm type as illustrated in FIG. 5, the flow control accuracy is further enhanced.

Since the exhaust switching valve 17 is not needed to take a partial opening position, the actuator 16 can be a single diaphragm actuator. As a result, the actuator 16 is of a smaller size and needs a smaller space to mount than a double diaphragm actuator. Though it is necessary to provide a space for mounting the actuator 42 for actuating the exhaust bypass valve 41, such a space can be prepared in the vicinity of the turbine 8a just as the space for mounting the actuator 9 for actuating the waste gate valve 31 can be prepared in the vicinity of the turbine 7a.

The exhaust switching valve 17 and the exhaust bypass valve 41 are located downstream of the turbine 8a of the second turbocharger 8. Since the energy of the exhaust gas is absorbed by the turbocharger 8 and the temperature of the exhaust gas is lowered by about 100° C. at the turbine 8a, the location of the valves 17 and 41 downstream of the turbine 8a makes it easy to protect the valves 17 and 41 from thermal damage.

Further, the second exhaust conduit 20b is disposed on a front side of the first exhaust conduit 20a in a front-rear direction of the vehicle. As a result, the second exhaust conduit 20b can receive more vehicle running wind flow and is cooled more than the first exhaust conduit 20a. Therefore, the exhaust switching valve 17 which is installed in the second exhaust conduit 20b is prevented from rising to too high of a temperature. This also protects the exhaust switching valve 17 from thermal damage.

Next, features specific to each embodiment of the present invention will be explained.

Figure 4:
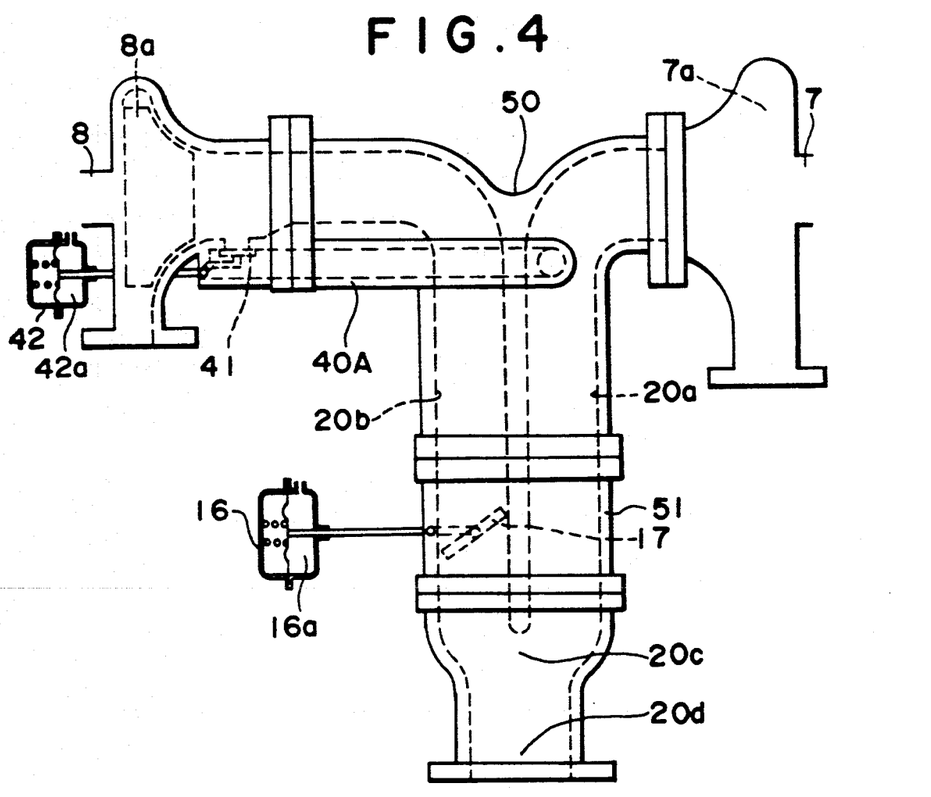
FIG. 4 is an elevational view of structures of members located in the vicinity of an exhaust bypass conduit of an internal combustion engine in accordance with a first embodiment of the present invention.

In the first embodiment, as illustrated in FIGS. 4 and 5, an exhaust by-pass conduit 40A extends from an outlet of the turbine 8a to the first exhaust conduit 20a. Due to this structure, the length of the exhaust bypass conduit a can be minimized, so that interference of the conduit 40A with other members is effectively prevented and a quick warming up of the catalytic converter 21 is possible, because the heat capacity of the conduit 40A is small.

Figure 6:
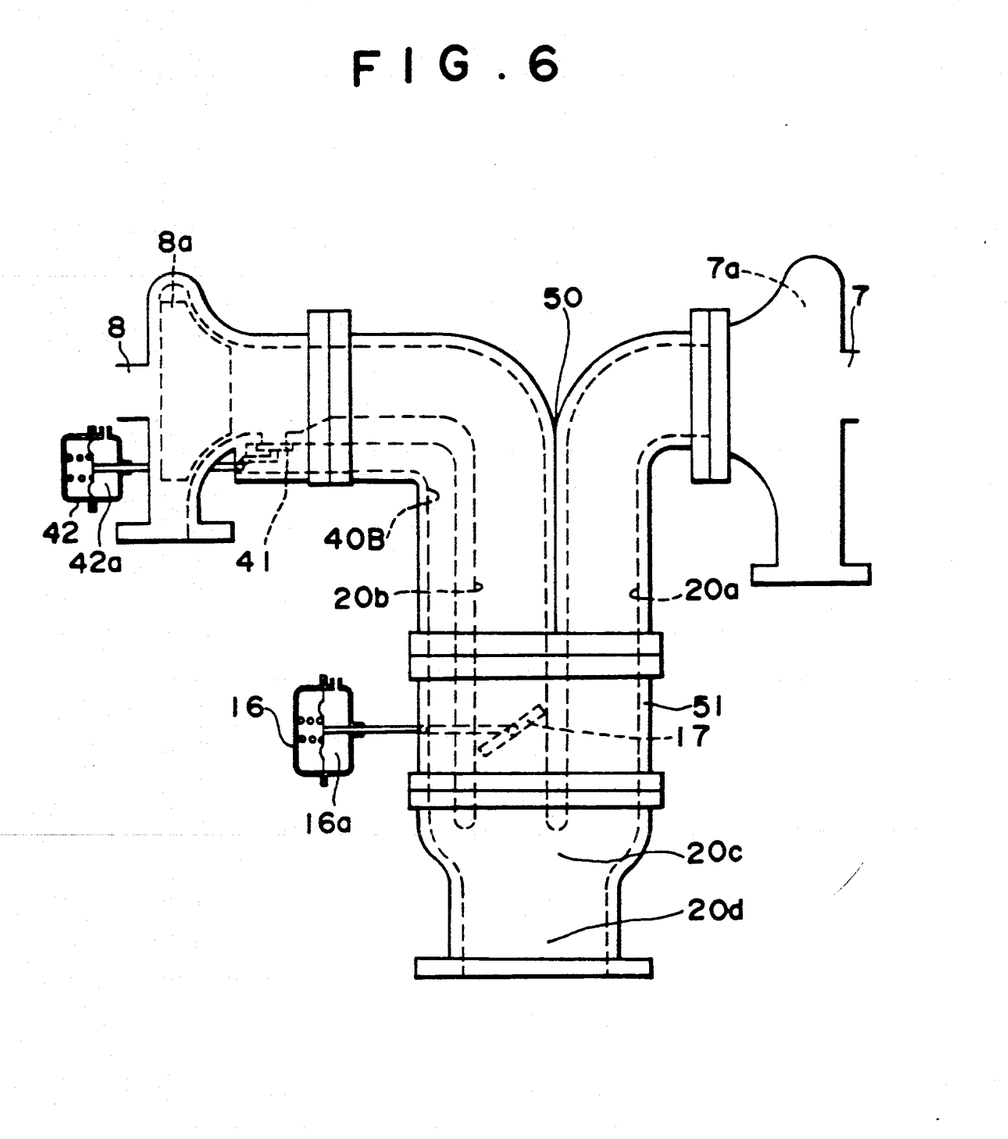
FIG. 6 is an elevational view of structures of members located in the vicinity of an exhaust bypass conduit of an internal combustion engine in accordance with a second embodiment of the present invention.

In the second embodiment, as illustrated in FIG. 6, an exhaust bypass conduit 40B is formed in the wall of the second exhaust conduit 20b. The exhaust bypass conduit 40B extends from the turbine outlet of the second turbocharger 8 to the connecting portion 20c of the first and second exhaust conduits and extends along the second exhaust conduit 20b. Due to the formation of the conduit 40B in the wall of the conduit 20b, the exhaust bypass conduit 40B can be constructed compactly. As a result, interference of the conduit 40B with other members is prevented.

Figure 7:
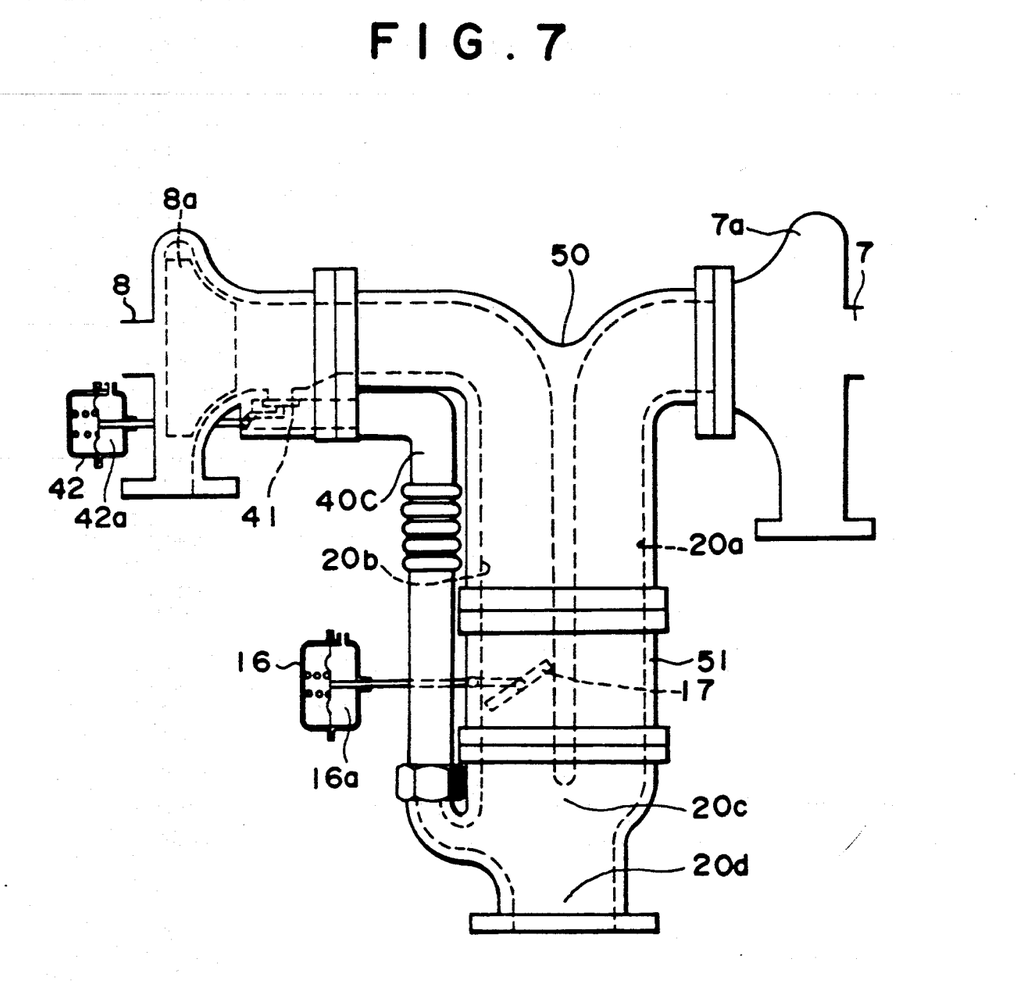
FIG. 7 is an elevational view of structures of members located in the vicinity of an exhaust bypass conduit of an internal combustion engine in accordance with a third embodiment of the present invention.

In the third embodiment, as illustrated in FIG. 7, an exhaust bypass conduit 40C is formed separately from the second exhaust conduit 20b and is constructed of a pipe including bellows means. The exhaust bypass conduit 40C extends from the turbine outlet of the second turbocharger 8 to the connecting portion 20c of the first and second exhaust conduits and extends along the second exhaust conduit 20b. Due to this structure, the exhaust bypass conduit 40C can be constructed compactly so that interference of the conduit 40C with other members is prevented and quick warming-up of the catalytic converter 21 is possible.

Figure 8:
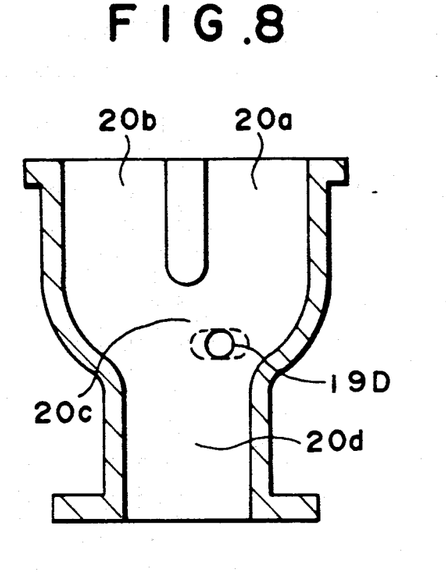
FIG. 8 is an elevational view of structures of members located in the vicinity of an oxygen sensor of an internal combustion engine in accordance with a fourth embodiment of the present invention.

In the fourth embodiment, as illustrated in FIG. 8, an oxygen sensor 19D is installed in the vicinity of the connecting portion 20c of the first and second exhaust conduits so as to be offset toward the first exhaust conduit 20a from a center of the connecting portion 20c. Since the exhaust gases flow only through the first exhaust conduit 20a when the exhaust switching valve 17 is closed, the oxygen sensor 19D is preferably offset toward the first exhaust conduit 20a in order to effectively detect the oxygen contents in the exhaust gases at the time of "one-turbocharger-operation".

Figure 9:
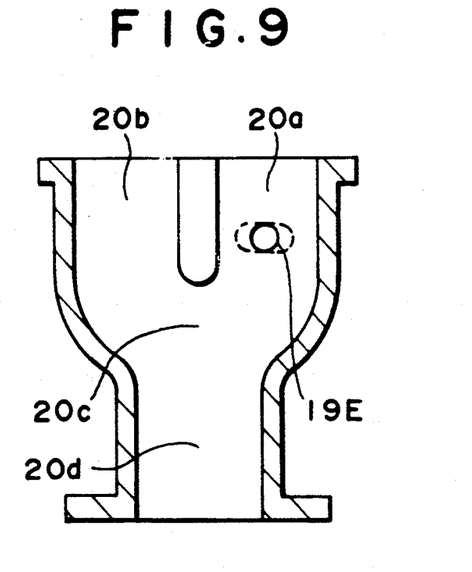
FIG. 9 is an elevational view of structures of members located in the vicinity of an oxygen sensor of an internal combustion engine in accordance with a fifth embodiment of the present invention.

In the fifth embodiment, as illustrated in FIG. 9, an oxygen sensor 19E is installed in the first exhaust conduit 20a, that is, not in the connecting portion 20c. Due to this structure, the oxygen contents in the exhaust gases at the time of "one-turbocharger-operation" can be detected even more effectively.

It is especially preferable to combine the first embodiment and any one of the fourth embodiment and the fifth embodiment. More particularly, when the exhaust bypass conduit 40 extends to the first exhaust conduit 20a, the oxygen sensor 19 is preferably offset toward the first exhaust conduit 20a or is provided in the first exhaust conduit 20a. Due to this, not only during "one-turbocharger-operation" but also during running-up of the second turbocharger 8, all the exhaust gases from all of the six cylinders will flow the first exhaust conduit 20a and will be able to hit the oxygen sensor 19. As a result, the oxygen sensing ability of the oxygen sensor 19 and the warming up characteristic of the oxygen sensor 19 are greatly improved.

In accordance with the present invention, the following various advantages are obtained.

First, since the exhaust bypass conduit 40 and the exhaust bypass valve 41 are provided, changing from "one-turbocharger-operation" to "two-turbocharger-operation" can be performed smoothly without a great shock.

Second, since the exhaust switching valve 17 is not needed to take a partial opening position, the actuator 16 for actuating the exhaust switching valve 17 can be constructed of a single diaphram actuator of a small size. This makes it possible to mount the actuator 16 in a small space near the turbochargers 7 and 8.

Third, since the exhaust switching valve 17 and the exhaust bypass valve 41 are located downstream of the turbine 8a of the second turbocharger 8, the exhaust switching valve 17 and the exhaust bypass valve 41 are protected from being exposed to high temperatures, and the durability of the turbocharged engine apparatus is improved.

Although several embodiments of the invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. An internal combustion engine with a dual turbocharger system, comprising:
   a multi-cylinder internal combustion engine with an air intake and at least one exhaust outlet, cylinders of the engine being grouped into two groups;
   an exhaust manifold connected with the engine exhaust outlet, the exhaust manifold including a first portion connected to one group of the cylinders and a second portion connected to another group of the cylinders, the first portion and the second portion of the exhaust manifold communicating with each other by a connecting conduit;
   a first turbocharger and a second turbocharger arranged in parallel with each other with respect to the engine, each including a turbine and a compressor driven by the turbine, the compressors being connected with the air intake of the engine and the turbines being connected with the exhaust outlet of the engine via the exhaust manifold;
   an exhaust line including a first exhaust conduit connected with the first portion of the exhaust manifold, in which the turbine of the first turbocharger is installed, a second exhaust conduit connected with the second portion of the exhaust manifold, in which the turbine of the second turbocharger is installed, an exhaust connecting portion where the first exhaust conduit and the second exhaust conduit join each other, and an exhaust pipe located downstream of and connected with the exhaust connecting portion;
   an exhaust switching valve installed downstream of the turbine of the second turbocharger in the second exhaust conduit and adapted to open and close the second exhaust conduit;
   an exhaust bypass conduit connecting a portion of the second exhaust conduit downstream of the turbine of the second turbocharger and upstream of the exhaust switching valve with any one of a portion of the second exhaust conduit downstream of the exhaust switching valve, the exhaust connecting portion and a portion of the first exhaust conduit downstream of the turbine of the first turbocharger; and an exhaust bypass valve installed in the exhaust bypass conduit and adapted to open and close the exhaust bypass conduit.

2. The internal combustion engine with a dual turbocharger system according to claim 1, wherein a bore diameter of the exhaust bypass conduit is smaller than a bore diameter of the second exhaust conduit.

3. The internal combustion engine with a dual turbocharger system according to claim 1, and further comprising an actuator coupled to the exhaust switching valve for opening and closing the exhaust switching valve, the actuator comprising a single diaphragm-type actuator.

4. The internal combustion engine with a dual turbocharger system according to claim 1, wherein the exhaust switching valve comprises a butterfly valve.

5. The internal combustion engine with a dual turbocharger system according to claim 1, wherein the exhaust bypass valve comprises a swing arm-type valve.

6. The internal combustion engine with a dual turbocharger system according to claim 1, wherein the second exhaust conduit is disposed on a front side of the first exhaust conduit in a front to rear direction of a vehicle.

7. The internal combustion engine with a dual turbocharger system according to claim 1, and further comprising an oxygen sensor installed at the exhaust connecting portion of the exhaust line.

8. The internal combustion engine with a dual turbocharger system according to claim 1, and further comprising an intake line including a first intake conduit located downstream of and connected with the compressor of the first turbocharger, a second intake conduit located downstream of and connected with the compressor of the second turbocharger, and an intake connecting portion where the first intake conduit and the second intake conduit join each other, and a common intake conduit connecting the intake connecting portion with the air intake of the engine.

9. The internal combustion engine with a dual turbocharger system according to claim 8, and further comprising an intake switching valve installed in the second intake conduit and adapted to open and close the second intake conduit.

10. The internal combustion engine with a dual turbocharger system according to claim 9, and further comprising an intake bypass conduit connecting a portion of the second intake conduit downstream of the compressor of the second turbocharger and upstream of the intake switching valve with a portion of the intake line upstream of the compressor of the second turbocharger and the compressor of the first turbocharger.

11. The internal combustion engine with a dual turbocharger system according to claim 10, and further comprising an intake bypass valve installed in the intake bypass conduit and adapted to open and close the intake bypass conduit.

12. The internal combustion engine with a dual turbocharger system according to claim 1, wherein the first turbocharger is adapted to operate at all intake air quantities and the second turbocharger is adapted to operate only at great intake air quantities.

13. The internal combustion engine with a dual turbocharger system according to claim 1, wherein the exhaust switching valve is adapted to close the second exhaust conduit at small to medium intake air quantities and to open the second exhaust conduit at great intake air quantities, and the exhaust bypass valve is adapted to close the exhaust bypass conduit at small intake air quantities and to open the exhaust bypass conduit at medium intake air quantities before the exhaust switching valve opens the second exhaust conduit.

14. The internal combustion engine with a dual turbocharger according to claim 1, wherein the first exhaust conduit and the second exhaust conduit include turbine outlet elbows with two passages, an exhaust switching valve housing with two passages, and an upstream portion of a front exhaust pipe with two passages.

15. The internal combustion engine with a dual turbocharger system according to claim 1, wherein the exhaust bypass conduit extends from an outlet of the turbine of the second turbocharger to the first exhaust conduit.

16. The internal combustion engine with a dual turbocharger system according to claim 1, wherein the exhaust bypass conduit is formed in a wall of the second exhaust conduit and extends from an outlet of the turbine of the second turbocharger to the exhaust connecting portion of the exhaust line along the second exhaust conduit.

17. The internal combustion engine with a dual turbocharger system according to claim 1, wherein the exhaust bypass conduit comprises a pipe constructed separate from the second exhaust conduit and extending from an outlet of the turbine of the second turbocharger to the exhaust connecting portion of the exhaust line along the second exhaust conduit.

18. The internal combustion engine with a dual turbocharger system according to any one of claim 1 and claim 15, and further comprising an oxygen sensor which is installed in the exhaust connecting portion of the exhaust line so as to be offset toward the first exhaust conduit from a center of the exhaust connecting portion.

19. The internal combustion engine with a dual turbocharger system according to any one of claim 1 and claim 15, and further comprising an oxygen sensor which is installed in the first exhaust conduit.

* * * * *